Nov. 29, 1966    H. A. WHEELER    3,289,206
PHASE-COMPARISON NAVIGATION SYSTEM
UTILIZING SPIRAL PHASE CONTOURS
Filed Dec. 9, 1963    2 Sheets-Sheet 1

United States Patent Office 3,289,206
Patented Nov. 29, 1966

3,289,206
PHASE-COMPARISON NAVIGATION SYSTEM UTILIZING SPIRAL PHASE CONTOURS
Harold A. Wheeler, Great Neck, N.Y., assignor to Hazeltine Research Inc., a corporation of Illinois
Filed Dec. 9, 1963, Ser. No. 328,963
9 Claims. (Cl. 343—105)

This invention pertains to phase-comparison navigation systems of the type permitting a movable vehicle's position to be determined by phase comparison of signals received from a plurality of antennas of fixed position. Systems in accordance with the invention utilize antennas having omnidirective antenna patterns with rotary phase contours as the transmitting antennas or as vehicle mounted antennas, or both.

Personnel aboard a moving vehicle, such as a ship at sea, can determine the position of such ship by using established methods, such as celestial navigation, dead reckoning, etc. The present invention is directed toward permitting personnel having such information to then determine the ship's position more accurately than is possible with such prior methods.

Objects of this invention are to provide new and improved phase-comparison navigation systems, one particular object being to provide systems enabling navigation by submerged submarines.

For a better understanding of the present invention together with other and further objects thereof, reference is had to the following description taken in connection with the accompanying drawings, and its scope will be pointed out in the appended claims.

Figure 1:
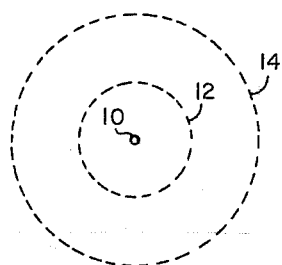
FIGS. 1 and 2 are schematic representations of two types of antennas useful in systems constructed in accordance with the present invention.
Figure 2:
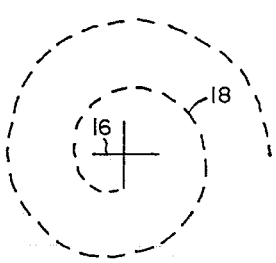

In one particular arrangement in accordance with the invention, there are included a plurality of transmitting antennas of a first type shown schematically in FIG. 1. In FIG. 1, 10 represents a top view of a simple vertical wire antenna. As is well known, such an antenna has an antenna pattern which is omnidirective with circular phase contours. This is indicated in FIG. 1 by dotted circles 12 and 14 which represent two circular phase contours associated with antenna 10. In the arrangement under discussion, each transmitting antenna is similar to antenna 10 and is mounted at a fixed position and used for transmitting signals which are useful for purposes of navigation, as will be described in greater detail. In the system under discussion, there is further included a receiving antenna of a second type shown schematically in FIG. 2. In FIG. 2, 16 represents a top view of a crossed-loop antenna having a pair of loops electrically coupled in quadrature so as to provide an omnidirective antenna pattern with rotary phase and spiral phase contours. This is shown in FIG. 2 by dotted spiral 18 which represents a contour associated with rotary phase in antenna 16. A particular form of the FIG. 2 antenna will be discussed in greater detail with reference to FIG. 5.

Figure 3:
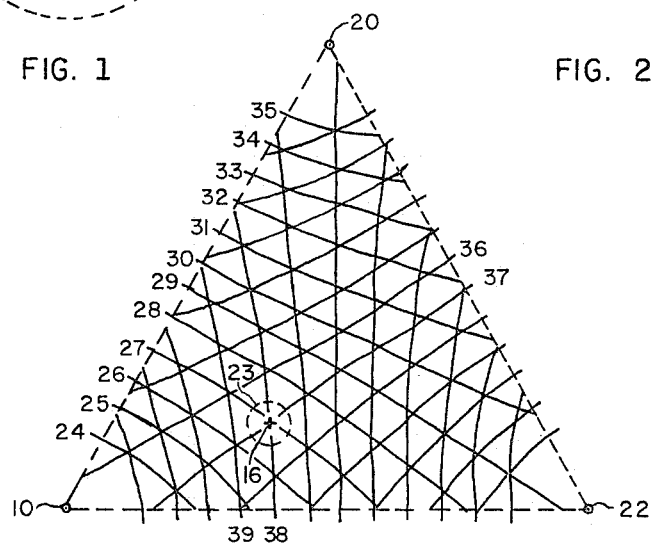
FIG. 3 is a schematic representation of one form of complete navigation system constructed in accordance with the invention utilizing antennas of the types shown in FIGS. 1 and 2.

Referring now to FIG. 3, a complete system constructed in accordance with the invention will be described in greater detail. In FIG. 3 there are shown three transmitting antennas 10, 20 and 22, each of the type shown in FIG. 1, and a receiving antenna 16 of the type shown in FIG. 2. Each of antennas 10, 20 and 22 is mounted at a fixed position and antenna 16 is mounted aboard a movable vehicle. The complete navigation system of FIG. 3 is constructed and arranged so as to enable the position of receiving antenna 16 to be determined by phase comparison of signals received from a set of three transmitting antennas 10, 20 and 22 which are located at the points of a triangle within which the receiving antenna 16 is located.

Let us assume that antenna 16 is mounted on a ship afloat in the ocean and that the position of antenna 16 as shown in FIG. 3 represents the actual physical location of the ship. Let use further assume that personnel aboard the ship, using prior navigational aids, are able to determine the position of the ship to an accuracy such that the ship is known to be located somewhere within the circle 23, but the actual position within circle 23 is not known.

In accordance with the present embodiment of the invention, each antenna 10, 20 and 22 is caused to constantly transmit synchronized time-sharing signals at a predetermined frequency, so that each pair of transmitting antennas gives rise to a stationary interference pattern. In order to be meaningful, an interference pattern must be related to both the transmitting antennas and the antenna which is to be used to receive signals from the transmitting antennas. The interference pattern relative to a spiral contour antenna such as 16, which is produced by the interaction of signals from antennas 10 and 20 is represented in FIG. 3 by the lines 24 to 35, inclusive. Antennas 20 and 22 give rise to a similar type of interference pattern relative to antenna 16 and two lines of this second pattern are labeled 36 and 37. Antennas 22 and 10 also give rise to a similar type of interference pattern relative to antenna 16 and two lines of this third pattern are labeled 38 and 39.

Each of these lines in FIG. 3 represents the locus of points at which signals from two of the transmitting antennas will be exactly in-phase after reception by antenna 16. The phase of a signal received by an antenna such as 16 having an antenna pattern with spiral phase contours is dependent upon the angle of reception. The contours of FIG. 3 are not the loci of points at which signals from two transmitters are in-phase, but are the loci of points at which signals from two transmitters appear to be in-phase after being subjected to the phase-azimuth characteristics of antenna 16 during reception by antenna 16. The loci of points at which signals after reception by antenna 16 will be 180° out of phase, or will have any other desired phase difference, are represented by families of contours similar to those of FIG. 3.

In accordance with the present invention, the position of the antenna 16 is determined by comparing the phase of signals received from pairs of the three transmitting antennas 10, 20 and 22 and interpreting the results of such comparison in view of knowledge of the interference patterns shown in FIG. 3. In the present example, phase comparison will show that, as received by antenna 16, signals from antennas 10 and 20 are exactly in-phase, signals from antennas 20 and 22 are exactly in-phase and signals from antennas 22 and 10 are exactly in-phase. With the knowledge that the ship is positioned somewhere within circle 23 and the knowledge that the composite, three-transmitter interference pattern is as shown in FIG. 3, an accurate determination of position can readily be made. There is only one point inside circle 23 at which signals of equal phase will be received from each pair of transmitting antennas by antenna 16. That point is at the intersection of lines 27, 37 and 38, which is therefore the point at which the ship is located.

Two things should be noted. First, phase comparisons of signals from only two pairs of transmitting antennas are required for an unambiguous position determination. Thus, knowledge that the position is at the intersection of two lines such as 27 and 37 is sufficient and the additional information that line 38 also intersects at the same point could either be used as a safety check or simply ignored. Second, it will obviously be more likely that a ship would not positioned exactly at a point of reception of equal phase signals from each pair of antennas. In such case, phase comparison would show a particular phase difference between the signals received from each pair of transmitting antennas and it would be necessary to interpolate to determine the point in the composite interference pattern at which the measured phase differences were satisfied.

If the frequency used for transmission of signals from antennas 10, 20 and 22 is in the vicinity of ten kilocycles, the individual lines (such as 36 and 37) would be separated by approximately 12 or 15 miles. If the original rough approximation of position can be made within a maximum error of five miles in any direction (this can be represented by a circle 23 having a diameter of ten miles) then there will be no possibility of ambiguity in the position represented by the measured differences in phase of the received signals. It will be appreciated that at the intersection of lines 36 and 38, lines 36 and 39, lines 37 and 39, etc., the phase relations of received signals are the same as at the intersection of lines 37 and 38. Therefore, if the original rough approximation of position resulted in a circle 23 of large enough diameter to enclose the intersection of lines 37 and 38 as well as one of these other intersections, unambiguous determination of position would be impossible. As a result, the operating wavelength must be chosen large enough, relative to the accuracy with which a rough approximation of position can be made, to avoid such ambiguity.

FIG. 3 shows the composite interference pattern which would exist surrounding a group of three transmitting antennas. This pattern would exist as a pattern of electromagnetic energy which would be coupled to a receiving antenna aboard a ship afloat on the ocean, an aircraft flying in the area or a submerged submarine. If high power transmitters are used, the earth's surface could be divided into about eight triangles, each such triangle covered by an interference pattern formed by transmitting antennas at the points of the triangles. FIG. 3 shows an equilateral triangle but there is no necessity that equilateral triangles be used.

Figure 4:
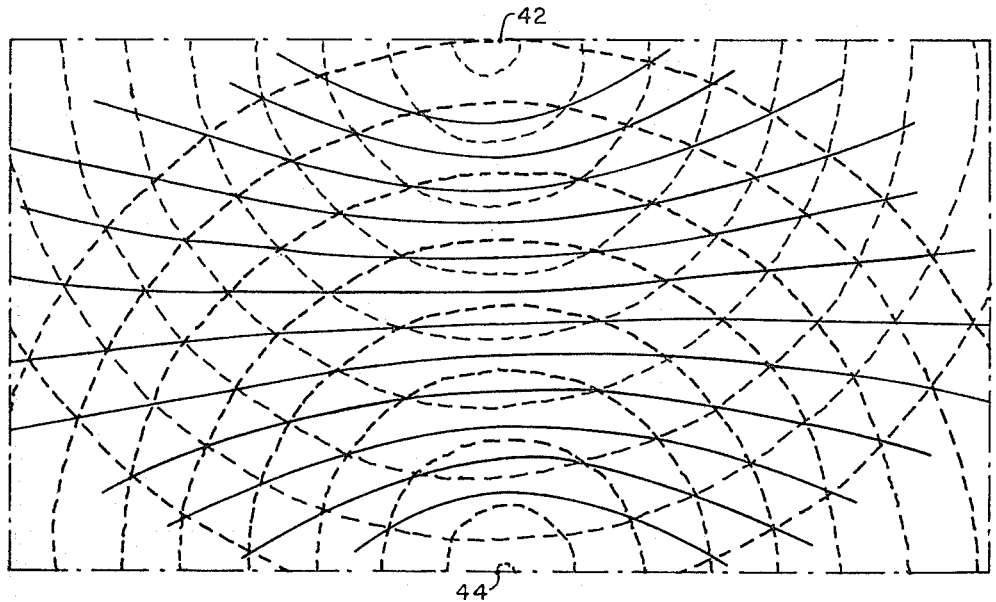
FIG. 4 is a drawing useful in describing the types of interference pattern set up in operation of the FIG. 3 system.

In application of the invention it would be desirable to provide charts for use in navigation. Such charts could take the form of a representation of the interference pattern of FIG. 3 superimposed on a map of the area involved. Referring now to FIG. 4, there is shown one method for drawing the lines of an interference pattern produced by a pair of antennas in the FIG. 3 system relative to the receiving antenna 16. The antennas are assumed to be located at points 42 and 44 of FIG. 4. Spirals, shown dotted, are drawn about each of points 42 and 44 with the radial distance between successive lines of the spiral equal to the wavelength involved reduced in the same scale as the map which is to be used. The actual interference pattern can then be drawn by interconnecting, as shown in FIG. 4, the points of intersection of the turns of the two spirals which represent points of the same relative phase difference.

Figure 5A:
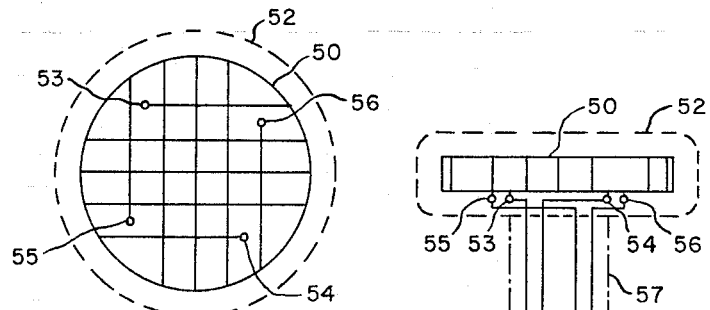
FIG. 5a is a detached bottom view of a crossed loop antenna.
Figure 5B:
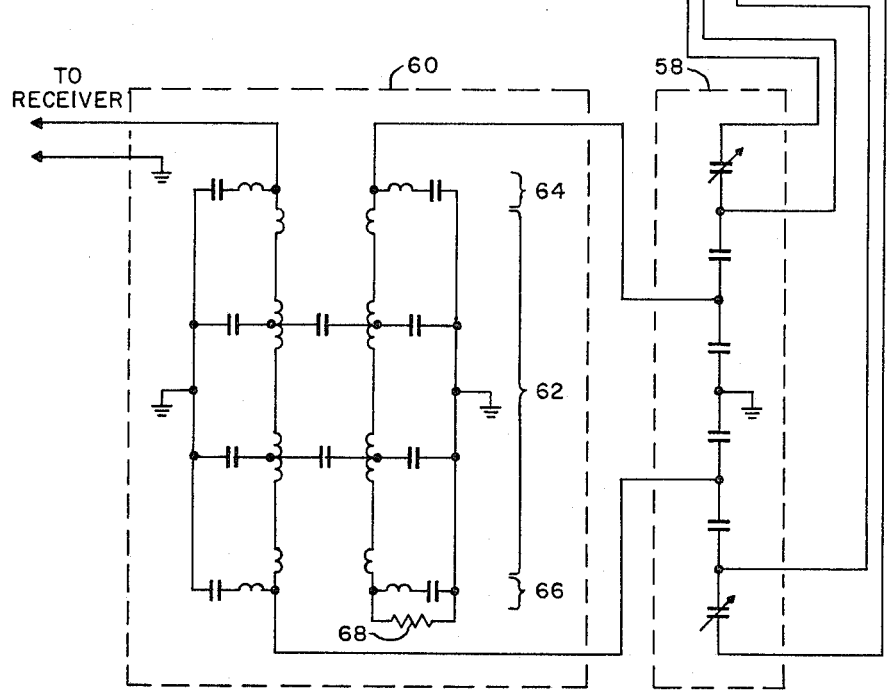
FIG. 5b is a side view of the FIG. 5a crossed loop antenna electrically connected in quadrature.

Referring now to FIGS. 5a and 5b, there are respectively shown a detached bottom view of a crossed-loop antenna and a side view of the same antenna with the loops electrically coupled in quadrature so as to provide an antenna having an omnidirective antenna pattern with rotary phase contours. As shown, the antenna includes a high-permeability ferrite core 50 in the shape of a relatively thin circular disc. Two crossed loops in the form of two coils having end terminals 53, 54 and 55, 56, respectively, are distributed over the surface of core 50 with mutually perpendicular axii. The core 50 and associated coils are enclosed in a casing of insulating material 52, shown dotted. This complete package is in a form suitable for mounting on a mast such as 57 (shown dotted) on a submarine. The mounting should be such that the disc 50 is maintained substantially horizontal.

In FIG. 5 the loops defined by end terminals 53, 54 and 55, 56 are connected to a directional coupler 60, via a coupling network 58 which is made up of six capacitors (two of which are variable for purposes of adjustment). The directional coupler 60 is made up of lumped inductors and capacitors interconnected as shown to form low-pass filters simulating a long transmission line. The inductors and capacitors appearing to the left of the bracket 62 are interconnected to form intercoupled filter sections having an electrical length of approximately a quarter of the operating wavelength and designed to provide directional coupling of one-half power. The inductors and capacitors appearing to the left of brackets 64 and 66 form M-derived terminations for the filter sections, so as to permit connection to external circuits. As shown, opposite ends of the two filter sections connect to the coupling network 58, another end is used for coupling to receiver circuits and the remaining end connects to terminating resistor 68. Particulars of the FIG. 5 circuit can be determined for specific applications by workers skilled in the art using established design techniques. The antenna, coupling network and directional coupler of FIG. 5 are shown merely for purposes of example and other arrangements may be substituted in navigation systems constructed in accordance with the invention.

In the specific embodiment of the invention which has been described, antennas having antenna patterns with circular phase contours are used for transmission and the receiving antenna has an antenna pattern with rotary-phase spiral contours. In other arrangements it may be desirable to use rotary-phase spiral contours for transmission and circular phase contours for reception, or to use antennas with rotary-phase spiral contour antenna patterns for both transmission and reception.

In one embodiment of the last-mentioned system, utilizing rotary-phase spiral contour antennas for both transmission and reception, all antennas patterns have the same direction of rotation. Charts for this embodiment can be constructed as described with reference to FIG. 4, except that the spirals surrounding points 42 and 44 are of double periodicity (i.e., the radial distance between successive lines of each spiral is equal to two wavelengths). In a second embodiment of the system under discussion, all transmitting antennas have patterns with the same direction of rotation which is opposite to the direction of rotation of the pattern of the receiving antenna. Charts for this embodiment can be constructed as described with reference to FIG. 4, except that the contours surrounding points 42 and 44 are circles with a radial separation of one wavelength.

An important feature of this invention is the use of antennas having antenna patterns with rotary-phase spiral contours. This is important because crossed-loop antennas of this type can be used on a submarine to permit reception of navigation signals while both the submarine and the antenna are submerged.

While there have been described what are at present considered to be the preferred embodiments of this invention, it will be obvious to those skilled in the art that various changes and modifications may be made therein without departing from the invention and it is, therefore, aimed to cover all such changes and modifications as fall within the true spirit and scope of the invention.

What is claimed is:
1. A phase-comparison navigation system comprising:
a plurality of transmitting antennas of a first type mounted at fixed positions, for transmitting signals which are useful for purposes of navigation;
and a receiving antenna of a second type mounted on a movable vehicle, for receiving signals from a plurality of said transmitting antennas simultaneously;
at least one of said types of antenna comprising a crossed-loop antenna having a pair of loops electrically coupled in quadrature so as to provide an omnidirective antenna pattern with spiral phase contours for enabling the position of said receiving antenna to be determined by phase comparison of signals received from a set of three of said transmitting antennas located at the points of a triangle within which the receiving antenna is located.

2. A navigation system of the type described in claim 1, where in each transmitting antenna has an omnidirective antenna pattern with circular phase contours and the receiving antenna is a crossed-loop antenna of the type described in claim 1.

3. A navigation system of the type described in claim 1, wherein each transmitting antenna is a crossed-loop antenna of the type described in claim 1 and the receiving antenna has an omnidirective antenna pattern with circular phase contours.

4. A navigation system of the type described in claim 1, wherein both the transmitting antennas and the receiving antenna are crossed-loop antennas of the type described in claim 1 and all antenna patterns have the same direction of rotation.

5. A navigation system of the type described in claim 1, wherein both the transmitting antennas and the receiving antenna are crossed-loop antennas of the type described in claim 1 and all transmitting antennas have patterns with the same direction of rotation which is opposite to the direction of rotation of the pattern of the receiving antenna.

6. A phase-comparison navigation system comprising:
a plurality of transmitting antennas of a first type mounted at fixed positions, each said antenna transmitting a predetermined program of signals useful for purposes of navigation;
and a receiving antenna of a second type mounted on a movable vehicle, for receiving signals from a plurality of said transmitting antennas simultaneously;
one of said types of antenna comprising a crossed-loop antenna having a pair of loops electrically coupled in quadrature so as to provide an omnidirective antenna pattern with spiral phase contours and the other one of said types of antenna having an omnidirective antenna pattern with circular phase contours;
and a chart comprising a map with an over-laying grid of contour lines representing the loci of points at which signals of equal phase difference will be received by said receiving antenna from pairs of said transmitting antennas for enabling the position of a receiving antenna to be determined by locating on said chart the intersection of the two loci representing the phase differences between signals received from two pairs of a set of three of said transmitting antennas located at the points of a triangle within which the receiving antenna is located.

7. A navigation system of the type described in claim 6, wherein each transmitting antenna has an omnidirective antenna pattern with circular phase contours and the receiving antenna is a crossed-loop antenna of the type described in claim 6.

8. A navigation system of the type described in claim 6, wherein each transmitting antenna is a crossed-loop antenna of the type described in claim 6 and the receiving antenna has an omnidirective antenna pattern with circular phase contours.

9. A phase-comparison navigation system, permitting underwater navigation by submarines, comprising:
a plurality of transmitting antennas, mounted at fixed positions and each having an omnidirective antenna pattern with circular phase contours, for transmitting signals useful for purpose of navigation;
and a receiving antenna, mounted on a submarine and comprising a crossed-loop antenna having a pair of loops electrically coupled in quadrature so as to provide an omnidirective antenna pattern with spiral phase contours, for receiving signals from a plurality of said transmitting antennas simultaneously for enabling the position of said receiving antenna to be determined by phase comparison of signals received from a set of three transmitting antennas located at the points of a triangle within which the receiving antenna is located.

References Cited by the Examiner

UNITED STATES PATENTS

| 2,404,196 | 7/1946 | Seeley | 343—102 |
| 2,504,573 | 4/1950 | O'Brien | 343—105 |
| 2,511,030 | 6/1950 | Woodward | 343—105 X |
| 2,530,287 | 11/1950 | Chireix | 343—102 X |
| 2,626,392 | 1/1953 | O'Brien | 343—105 |
| 2,840,700 | 6/1958 | Browder | 340—4 |

CHESTER L. JUSTUS, *Primary Examiner.*

LEWIS H. MEYERS, *Examiner.*

H. C. WAMSLEY, *Assistant Examiner.*